H. MORE.
MILK-COOLERS.

No. 183,017. Patented Oct. 10, 1876.

Attest
D. Harry Hammer
Geo. B. Morgan

Inventor
Hiram More

JAMES R. OSGOOD & CO. BOSTON

UNITED STATES PATENT OFFICE.

HIRAM MORE, OF CHICAGO, ILLINOIS.

IMPROVEMENT IN MILK-COOLERS.

Specification forming part of Letters Patent No. 183,017, dated October 10, 1876; application filed June 21, 1876.

*To all whom it may concern:*

Be it known that I, HIRAM MORE, of Chicago, Cook county, Illinois, have invented a certain new and useful Improvement in Milk and Cream Coolers; and I do hereby declare that the following is a full, clear, and exact description of the said invention, reference being had to the accompanying drawings, making a part of this specification, in which—

Figure 1:
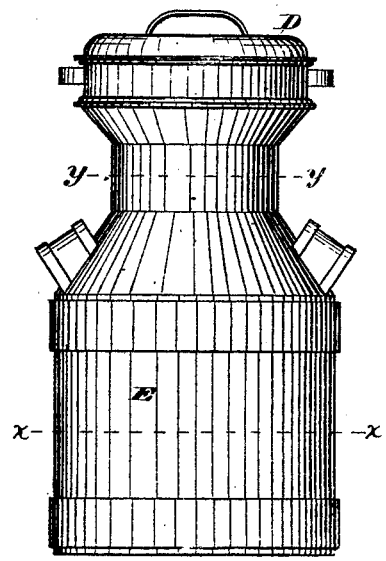
Figure 2:
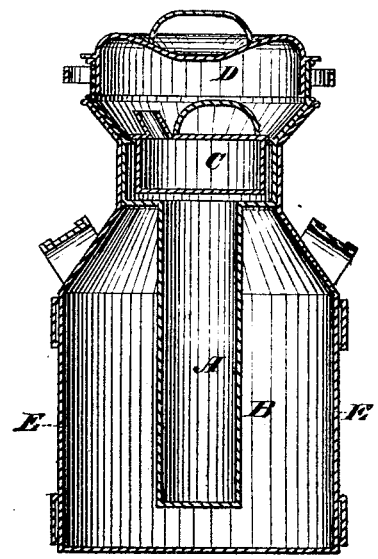
Figure 4:
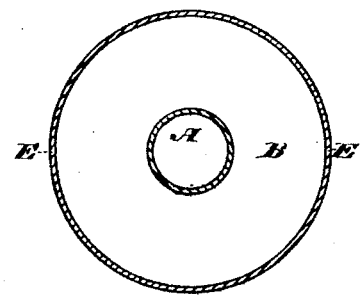
Figure 3:
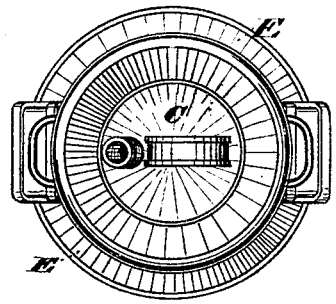
Figure 5:
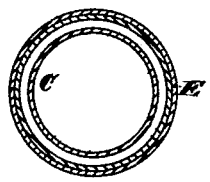

Figure 1 is a front view. Fig. 2 is a vertical section of Fig. 1. Fig. 3 is a top view, with the lid removed. Fig. 4 is a horizontal section on line $x\,x$ of Fig. 1. Fig. 5 is a horizontal section on line $y\,y$ of Fig. 1.

This invention relates to a milk and cream cooler, by which the cooling is accomplished with ice; and its nature consists in the construction and arrangement of the several parts, so that the milk and cream surround the ice.

To enable others skilled in the art to make and use this invention, I will proceed to describe the same.

A in Fig. 1 represents the ice-chamber or cylinder inside of the milk-can E E. B in same figure represents the milk-chamber of the can. C represents a cream-can constructed in connection with the milk-can. D is the cover.

The can is filled with milk. The chamber A is then filled with ice.

Fresh milk can be cooled in two hours fit for use and delivery, while by any other method of cooling it is necessary to let it stand half a day.

The cream-can, being immediately over the ice, is also just as readily cooled.

What I claim as new, and desire to secure by Letters Patent of the United States, is—

A milk-can, E, provided with a suspended ice-chamber, A, and removable cream-pot C, fitted to the top of said chamber A, and inclosed and protected by the can-cover D, all constructed and arranged substantially as set forth.

HIRAM MORE.

Witnesses:
   GEO. B. MORGAN,
   HENRY WIGHT.